UNITED STATES PATENT OFFICE.

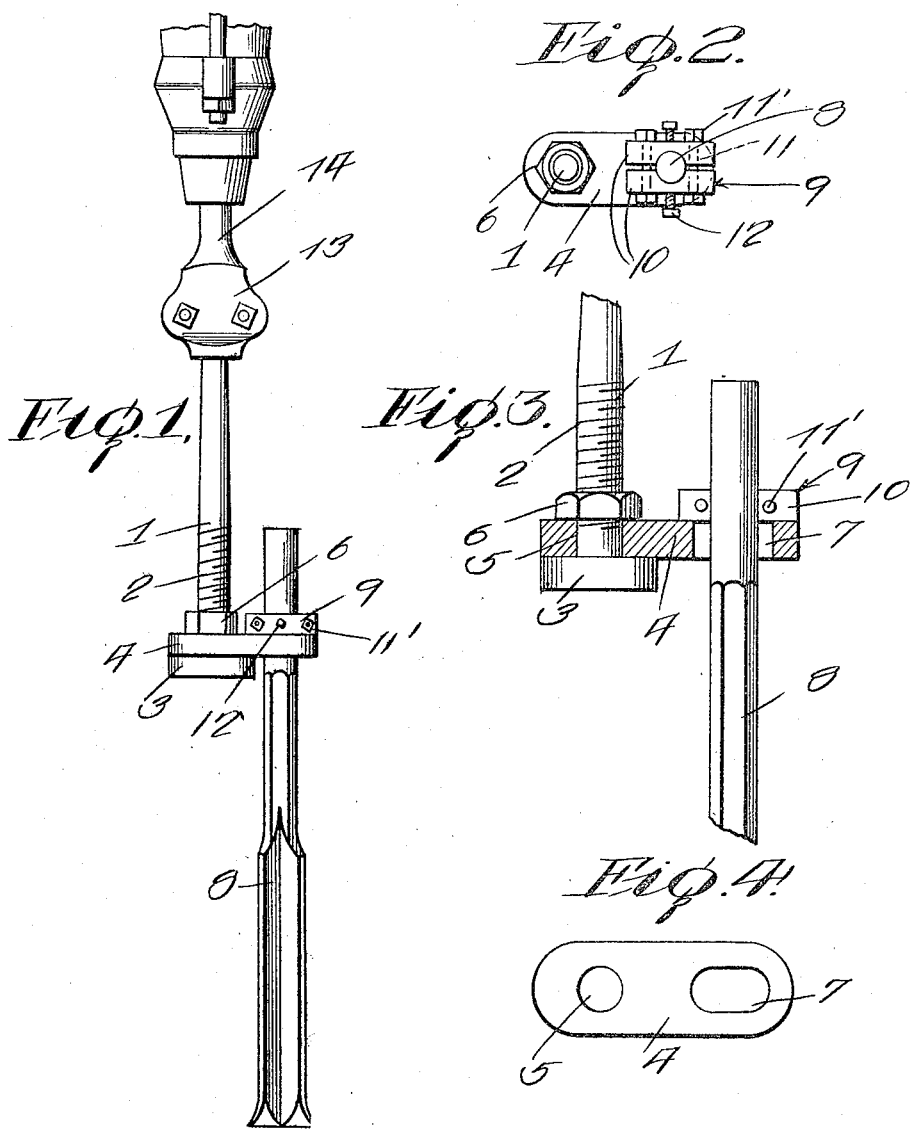

MICHAEL CONLEY, OF DENVER, COLORADO.

DRILL-EXTRACTOR.

1,133,709. Specification of Letters Patent. Patented Mar. 30, 1915.

Application filed April 22, 1914. Serial No. 833,727.

*To all whom it may concern:*

Be it known that I, MICHAEL CONLEY, a citizen of the United States, residing at Denver, in the county of Denver, State of Colorado, have invented certain new and useful Improvements in Drill-Extractors; and I do hereby declare the following to be a full, clear, and exact description of the invention, such as will enable others skilled in the art to which it appertains to make and use the same.

This invention relates to a drill extractor.

An object of the invention is to provide a device which will readily extract drills from holes in the material which is being drilled after the said drills have been fastened in the said material.

A further object of the invention is to provide a device which may be readily attached to the piston of the drill and operated thereby to extract the fastened drill.

With these and other objects in view, such as will appear as the description progresses, my invention comprises the combination and arrangement of parts as herein set forth and subsequently claimed.

Referring to the drawing: Figure 1 is a side elevation of my device in place on a drill piston. Fig. 2 is a plan view thereof detached from the said piston. Fig. 3 is a vertical section of the device. Fig. 4 is a detail plan view of the collar member.

Referring to the drawing by reference characters wherein like characters represent like parts throughout the several views, my device comprises a vertical rod 1 tapered upwardly and screw threaded at 2 near its bottom end. Formed on the bottom end of the rod 1 is a head 3. Resting on this head 3 and mounted on the rod 1 is a collar member 4 having an aperture 5 through which the rod extends. A nut 6 is screwed on the threads 2 of the rod 1 and into contact with the upper face of the collar 4 so as to hold the collar tightly in place upon the head 3. This collar extends a considerable distance beyond the periphery of the head 3 and has a slot 7 in its outer end. This slot 7 is adapted to accommodate the fastened drill rod 8 which extends up through the slot 7 and is prevented from being withdrawn therefrom downwardly by the clamp 9. This clamp comprises two parallel bars 10 having registering apertures 11 therein through which screws 12 pass to hold the clamp upon the drill rod 8. Extending through the sides of the said members 10 are set screws 12 which are adapted to be screwed tightly into engagement with the outer face of the drill rod and to prevent the clamp from slipping thereon.

The rod 1 fits into the chuck 13 carried by the piston 14 of the operating mechanism for the drill rod. When the drill rod has become fastened in the drill hole in which it is operating it is only necessary to detach the chuck from the upper end thereof insert the rod 1 in the said chuck and securely fasten it in this position. The slot 7 in the collar 4 is then placed down over the upper end of the rod 8 and loosely engages the same so that it may be reciprocated thereon. The clamp member 9 is then fastened to the drill rod immediately above the collar, the air is then allowed to enter the cylinder of the operating device and the piston is rapidly reciprocated as is common. The machine is then cranked upwardly and the collar member 4 on each upward reciprocation contacts with the clamp 9 which is securely fastened to the drill rod and tends to lift the same. As the drill rod is gradually loosened the machine is cranked further in an upward direction and the drill rod is gradually extracted from the hole by the reciprocating extracting device described.

It may be thus seen that I have provided a device which is extremely simple in construction and yet which will be very efficient in its operation and readily withdraw a drill which has become fastened in a hole in which it is operating.

I do not wish to be limited to the particular construction shown, but only so far as is necessary by the claims.

What is claimed is:—

1. A device of the class described comprising a vertical upwardly tapered bar, a head formed on the lower end thereof, a collar resting on said head and having an aperture therein through which the bar extends, means for clamping the collar upon the head, a clamp consisting of two parallel bars, screws securing their ends together adapted to be secured to the upper end of a drill means for securing the said clamp upon the drill, said collar having a slot in its outer end in which the drill is arranged to be loosely mounted, said clamp secured to the drill immediately above the said collar.

2. A device of the class described comprising a drill extractor, means arranged to be connected to the post of the drill operating mechanism, a collar mounted on said means and having a slot on its outer end adapted to encircle the drill and to reciprocate thereon, means for preventing said reciprocation in one direction on the drill beyond a predetermined point.

In testimony whereof, I affix my signature, in the presence of two witnesses.

MICHAEL CONLEY.

Witnesses:
ANNA JOHNSON,
J. W. ALLEN.